March 19, 1935. H. O. SWOBODA ET AL 1,994,838
METHOD AND APPARATUS FOR HANDLING MATERIALS
Filed Sept. 19, 1930 3 Sheets-Sheet 1
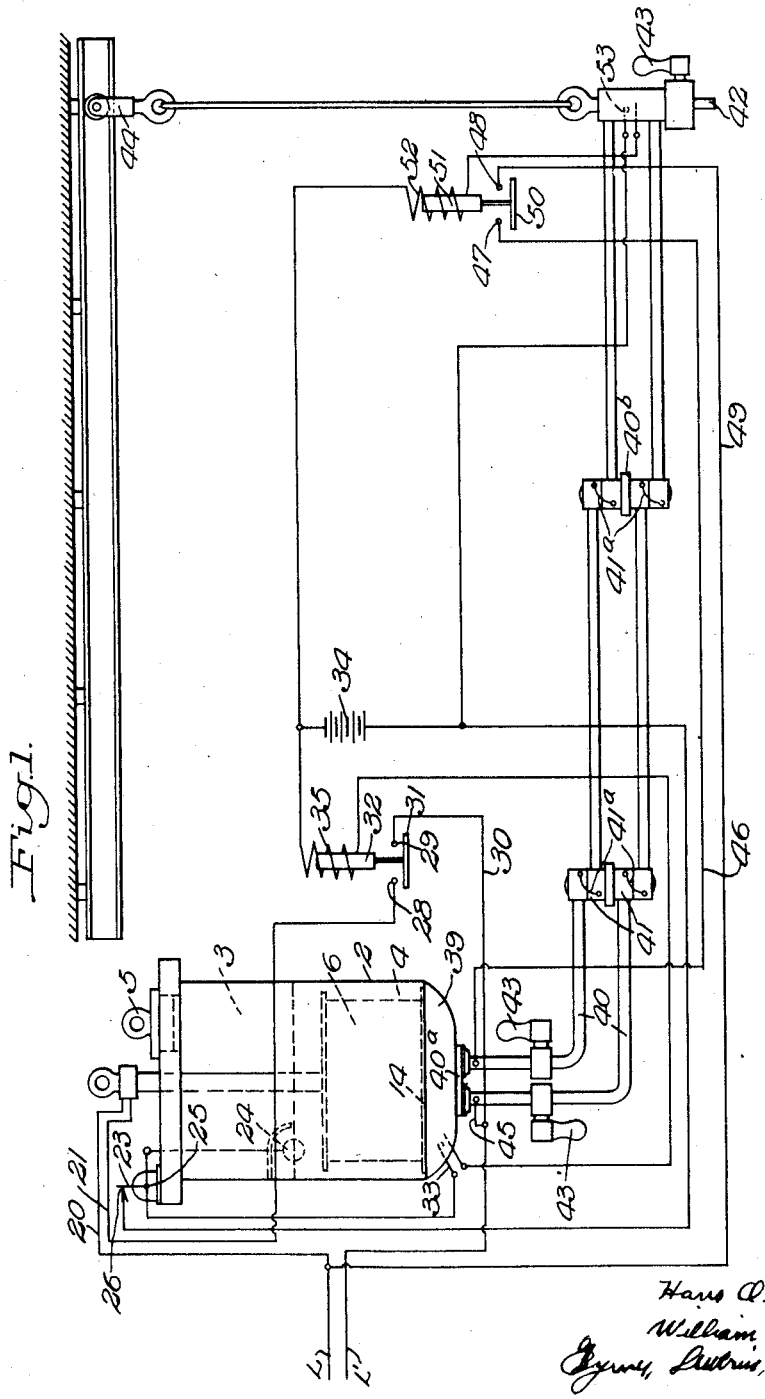

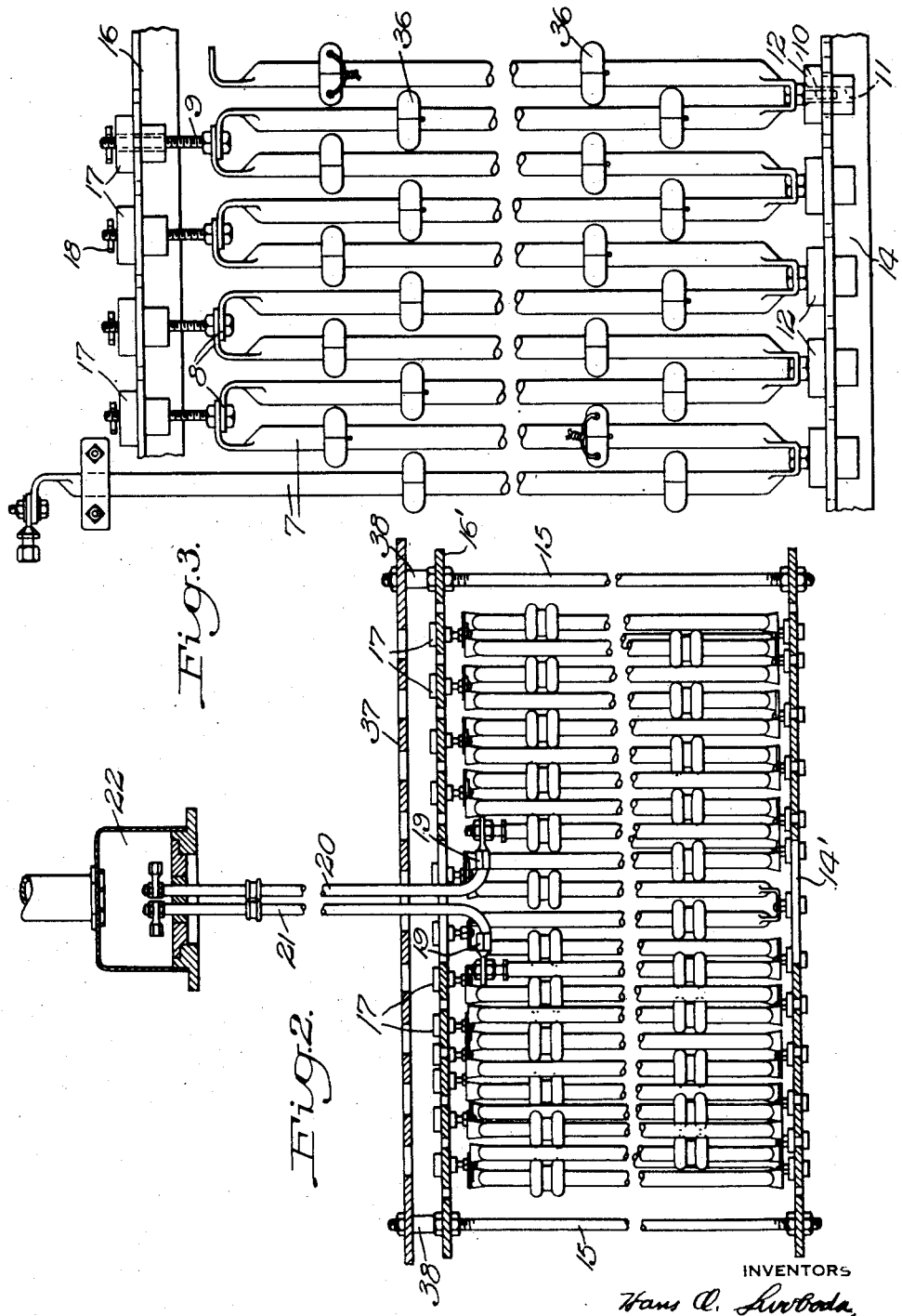

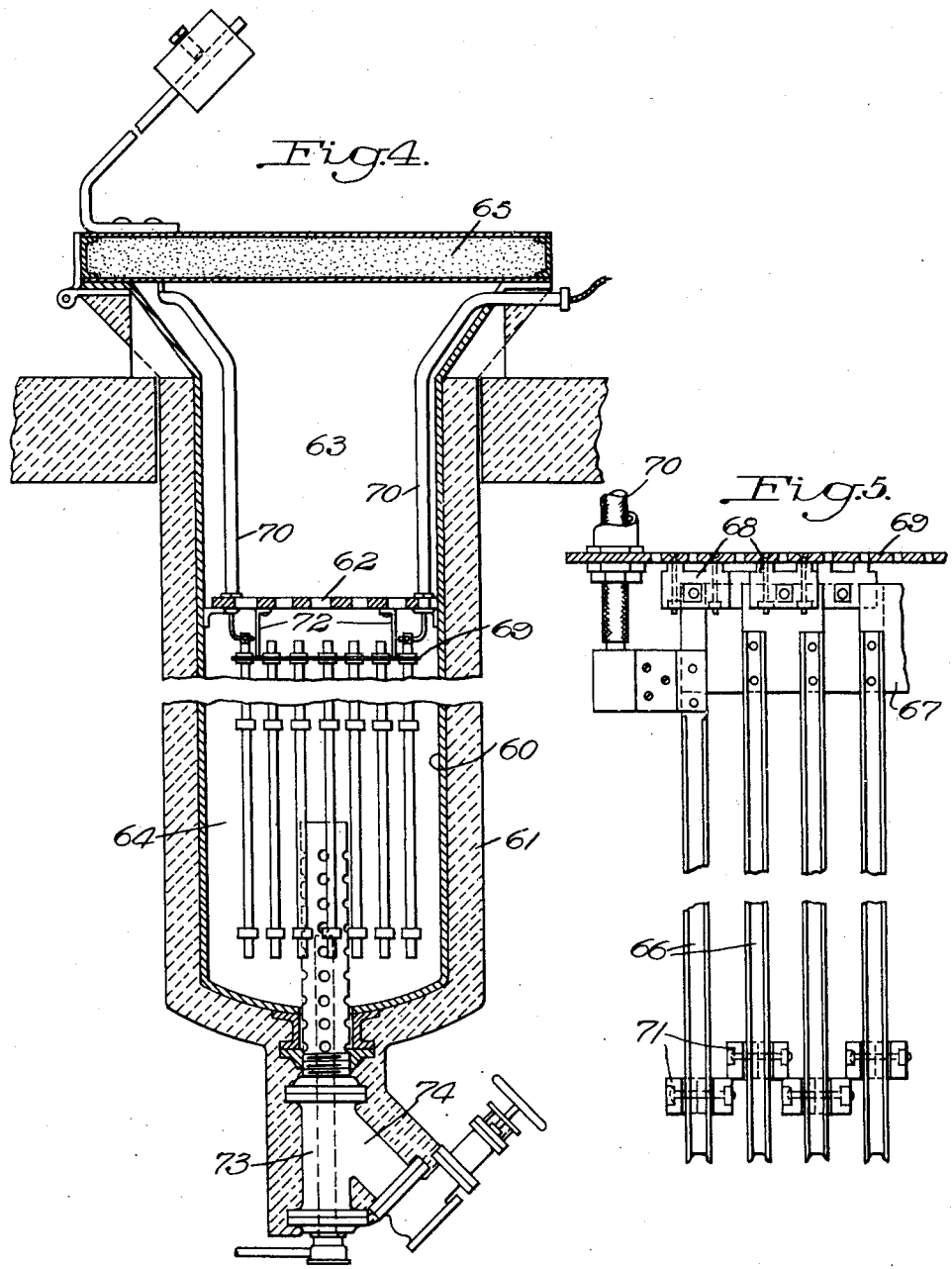

Patented Mar. 19, 1935

1,994,838

UNITED STATES PATENT OFFICE 1,994,838

METHOD AND APPARATUS FOR HANDLING MATERIALS

Hans O. Swoboda, Edgewood Borough, and William F. Metzger, Pittsburgh, Pa., assignors to H. O. Swoboda, Inc., Pittsburgh, Pa., a corporation of Pennsylvania Application September 19, 1930, Serial No. 483,008

9 Claims. (Cl. 219—19)

The present invention relates broadly to the art of handling materials, and more particularly to a method and apparatus for the heating, or the heating and distribution of materials susceptible to melting down under predetermined temperature conditions. For purposes of illustration the invention will hereinafter be described as applied to the melting or the melting and distribution of materials such as asphalt, it being understood, however, that the utility of the invention is not limited to the particular materials with which the method and apparatus are employed, although we have found that certain desirable advantages are obtained by utilizing the invention for the handling of asphalts, varnishes, oils, paints, paraffins, resins, and the like.

We have found that the liquefying of materials of the general nature referred to by means of heat involves certain difficulties due to the tendency of such materials under certain temperature conditions to break down and form deposits which not only interfere with the subsequent melting of the materials, but also result in deterioration of the materials and of the apparatus. Such a melting operation is characterized by two conditions which from a practical standpoint may be considered as in conflict one with the other. The first of these conditions is the desirability of having the material as fluid as possible in order to facilitate the subsequent handling thereof. The second of these conditions is that the increased fluidity can only be obtained with higher temperatures, and the higher temperatures result in bringing the materials closer to their flash point or breaking down temperature.

It has heretofore been proposed to effect the heating of such materials by placing the same within a container of suitable dimensions and applying heat to the container. Such a condition of heating, however, is objectionable for the reason that it provides a limited heat transfer surface, and a heating condition which is non-uniform throughout the body of the material. It has also been proposed to effect a melting operation by the utilization of conduits or the like through which a fluid heating medium is passed. While such a system affords a greater heat transfer surface, it is objectionable for the reason that the temperature of the heating medium necessarily decreases as it travels through the conduit, and consequently effects a non-uniform heat transfer.

In our Patent No. 1,787,801 granted January 6, 1931, we have disclosed a method and apparatus for treating bodies of material electrically and while in substantially quiescent condition by subjecting such material directly to heat generated electrically by the resistance of suitable conductors disposed in the material. Such a system is desirable for the reason that by properly arranging the conductors and properly choosing the material of which they are formed, it is possible to provide not only for substantially uniform heating of the material, but for a sufficiently large heat transfer surface so that the desired high temperature and consequent fluidity of the material can be obtained without danger of localized overheating of any one part of the material. Such a system is further characterized by the fact that a proper choice of conductors affords a substantially constant resistance per unit of length and consequently a substantially constant heat transfer per unit of surface.

We have found that it is possible by a suitable modification of the apparatus disclosed and claimed in the application referred to, to provide a system effective for substantially continuously melting down and delivering materials of the character referred to and at the same time to provide a reservoir for unmelted material of such capacity that intermittent charging of the apparatus is made possible.

It is one of the objects of the present invention, therefore, to provide a method and apparatus for melting and distributing materials by subjecting the same to a substantially constant heat transfer per unit of heat transfer surface, and so disposing such heat transfer surface as to effect substantially uniform heating of the material throughout the entire body thereof.

Another object of the invention is to provide means for maintaining the previously melted material at the desired temperature during the distribution thereof.

Still another object of the invention is to provide a system of the general character referred to characterized by the provision of means for controlling the temperature conditions in such manner that overheating and consequent breaking down, deterioration or flashing thereof is obviated. At the same time, such a temperature control makes it possible to maintain the heat transfer surface free from deposits, whereby frequent cleaning thereof is avoided and the objection of non-uniform heat transfer eliminated.

In the accompanying drawings we have shown for purposes of illustration only, certain preferred embodiments of the present invention. In the drawings:

Figure 1 is a diagrammatic view partly in elevation illustrating one form of system constructed in accordance with the present invention;

Figure 2 is a detail elevational and sectional view, on an enlarged scale, of the heat transfer means illustrated in Figure 1;

Figure 3 is a detail view, on an enlarged scale of a portion of a slightly modified form of heating means;

Figure 4 is a view similar to Figure 1 illustrating another embodiment of the invention; and Figure 5 is a view similar to Figure 3 illustrating in detail the heat transfer means shown in Figure 4.

Referring more particularly to Figures 1, 2 and 3 of the drawings, the present invention may be practiced by providing a container 2 of suitable shape and dimensions and, if desired, provided with heat insulation (not shown). Such container is preferably characterized by the presence of a charge receiving space 3 and a heating space 4. For facilitating the charging of the material into the space 3, there may be provided a suitable closure 5 which may be periodically removed at such periods as necessary to maintain the desired quantity of more or less solid material within the charge receiving space.

Located within the heating space 4 is a heating means 6 illustrated in detail in Figures 2 and 3. This heating means is herein illustrated as comprising a series of tubular or substantially tubular lengths 7 preferably having flattened end portions 8. The flattened end portions are conveniently bent at substantially right angles to facilitate the connection of the adjacent lengths, this being accomplished in the illustrated embodiment of the invention by means of bolts 9, whereby the overlapped end portions may be drawn firmly into engagement to insure proper electrical contact therebetween. If desired, the end portions may also be united by welding or the like to thereby provide a substantially unitary current carrying conductor from end to end.

The bolts 9 at the lower ends of the conductors as viewed in Figure 3 may be extended as indicated at 10 to cooperate with openings 11 in suitable insulators 12 carried by supporting means 14 herein illustrated as comprising an angle. In Figure 2 the angle is shown as replaced by a plate 14' in turn secured by heater plate spacing rods 15 to a heater guide plate 16' which is preferably generally similar to the support 14' and is provided with insulators 17 with which cooperate the upper bolts 9. It will be understood that the plate 16' replaces the angle 16.

The angles are desirable where the heating elements are only extended around the periphery of the container, while the plates are preferable where a substantially uniform arrangement of elements is desired. In some cases, and particularly where the specific gravity of the insulators 17 is substantially equal to the specific gravity of the material being handled, we provide the upper bolts 9 with suitable pins 18 extending transversely thereof above the insulators and effective for maintaining the same in the desired position within the heater guide plate 16. It will be apparent to those skilled in the art that the construction just described permits dimensional changes of the conductors 7 such as occur when current is passed therethrough.

For facilitating the delivery of current to the conductors, there are provided any desired number of terminals 19 to which are connected terminal leads 20 and 21 extending within a terminal box 22 preferably located outside of the container.

The terminal lead 20 is connected to a suitable source of current herein represented by the line wire L, while the opposite terminal lead 21 is electrically connected to a relay contact 28. The opposite relay contact 29 is connected by a lead 30 to the line wire L'.

So long as the level of the molten material within the container is at or above a predetermined point, the contact arm 23 of a float 24 through a pivotal mounting 25 is in engagement with a contact 26 and so long as the temperature of the material is below a predetermined point, contact is also established by a suitable thermostat or other heat responsive means 33. Both contacts are connected by suitable leads in series, with a suitable source of electric energy 34 and relay coil 35. The relay contacts 28 and 29 are bridged by a contact bar 31, which is connected to the armature 32 of the relay. Therefore, whenever contact 26 and thermostat 33 are closed, electric energy will pass into the heating means 6.

With the construction described, it will be apparent that should the level of the material drop below a predetermined plane, or should the temperature rise above a predetermined point, the heating circuit will be interrupted and remain interrupted until the level is re-established or until the temperature drops below such predetermined point. In this manner overheating of the material due either to excess current flow or to the presence of too small an amount of material is prevented.

Such a control is desirable for reasons hereinbefore referred to since it is important that the material be maintained at a high temperature to insure the necessary fluidity and still maintained at a temperature below that at which it will flash, deteriorate or break down and deposit. By properly choosing the material of which the conductors are formed, and making proper provision for the current flow from one conductor to the other, a substantially constant resistance and therefore potential drop per unit of length can be secured. This in turn results in a substantially uniform temperature from one end of the conductor to the other and therefore a substantially uniform heat transfer per unit of heat transfer surface. With the conductors so arranged as to extend throughout a substantial portion of the heating space, substantially uniform heating of the entire body of material is insured.

In order to maintain the conductors in properly spaced relation of one to the other, they may be provided with suitable insulating spacers 36 secured thereto in any desired manner and located at such points as to preclude the possibility of adjacent conductors coming into contact one with the other.

Due to the frangible nature of the insulators employed, it is desirable to protect the same against injury during the charging operation. For this purpose there may be provided a perforated shield 37 substantially co-extensive with the heater guide plate 16 and secured thereto in spaced relation by means of suitable spacing and tie rods 38. This shield provides in effect a partial partition between the heating space and the charging space.

In the embodiment of the invention illustrated in Figure 1, the support 14 is shown as being of such dimensions as to rest on the lower head 39 of the container whereby the entire heater is removably maintained in proper position in such manner that it may be readily lifted bodily from the container by simply disconnecting the terminal leads from the source of electric current. This facilitates cleaning of the apparatus as required as well as inspection and repair of the heat transfer conductors in case of necessity.

The material having been reduced to the desired fluid condition, it is desirable to provide means for distributing the same while maintaining such a fluid condition. For this purpose we have shown the container 2 as provided with delivery pipes 40 connected through joints 41 with a nozzle 42. Suitable valves 43 may be provided for controlling the flow of fluid material through the pipes 40, the entire system being movably supported by a suitable trolley 44 whereby the nozzle 42 may be moved at will to any one of a plurality of different delivery positions.

For maintaining the desired temperature of the material during its passage through the pipes 40, we may connect one of the pipes by a suitable lead 45 to the line wire L', the other pipe being connected by a lead 46 to a relay contact 47, the opposite contact 48 of which is connected by lead 49 to the line wire L. So long as the temperature of the material within the nozzle 42 is below a predetermined point the contacts 47 and 48 are bridged by a relay contact 50, the position of which is controlled by an armature 51 and relay coil 52. The relay coil is in turn energized or de-energized from the source 34 by means of a suitable temperature responsive means 53 located within the discharge nozzle. Any tendency toward an undesirable increase in temperature within the nozzle will result in opening the relay circuit and thereby dropping the contact bar 50 and breaking the circuit between the contacts 47 and 48.

As soon as the temperature drops below such predetermined point, the thermostat 53 will again close the relay circuit and re-establish the desired flow of current through the pipes 40. While we have herein illustrated two such pipes for purposes of convenience, it will be apparent that the number of pipes may be varied at will and that, if desired, one of the pipes may be replaced by a suitable lead or conductor. It will also be apparent that independent heating means for the nozzle itself may be provided, if desired, in order to insure proper temperature up to the actual point of discharge of material from the apparatus. Pipes 40 are electrically insulated from container 2 and from each other by insulation 40a. They are also electrically insulated from each other in joints 41 by insulation 40b. At joints 41 flexible connections 41a are provided to insure between the moving parts of said joints perfect electrical contact.

Pipes 40 and joints 41 are electrically as well as heat insulated, form as described an electrical circuit and, therefore, can be heated electrically. The heat insulation, in the interest of clear drawings is not shown. The object of using two pipes 40 is to eliminate from their swinging portion all cable connections and restrict the same to the stationary part.

In Figures 4 and 5 of the drawings there is illustrated a slightly modified embodiment of the invention herein shown as comprising a container 60 having heat insulation 61 and divided by a perforated support 62 into a charging space 63 and a heating space 64, the charging end of the container being accessible through a suitable cover 65. In this embodiment of the invention the heater is shown as comprising a series of channel sections 66 each of substantially U shape having their adjacent ends connected by connectors 67 secured to and supported by insulators 68 in turn secured to a mounting plate 69.

This mounting plate is herein shown as comprising a substantially flat perforated plate so as to afford an opportunity for proper distribution of the conductors. The current supply to the conductors may be effected through suitable terminal leads 70 as before described, and the conductors may be maintained in proper spaced relationship one to the other by means of suitable spacing insulators 71.

The heating means just described differs from that of Figures 1 to 3, primarily in that it is of the suspended type, being carried by the perforated support 62 through suitable hangers 72, and further in that the conductors are freely suspended entirely by the upper ends thereof and are of channel or similar section rather than tubular section. Such a construction, however, affords all of the operating advantages before referred to and enables uniform heating to a maximum temperature without possibility of flashing, breaking down or depositing of the material being heated.

While we have herein illustrated both of the heaters as being provided with a pair only of terminal leads, it will be apparent that the number of leads may be increased to correspond to the number of units into which the heater is divided or to properly cooperate with a multi-phase circuit, as will be readily apparent.

The container 60 is illustrated as provided with a supplemental heating means 73 cooperating with the outlet connection 74 whereby the desired temperature conditions during discharge of material may be maintained. This heating unit may be of any desired type of immersion or external heater.

It will be apparent that the present invention provides a method and apparatus for effectively receiving bulk solid or semi-solid material and gradually raising the temperature thereof to such a point as to impart fluid characteristics thereto, after which the more or less fluid material is subjected to a substantially uniform heating operation characterized by a substantially uniform heat transfer per unit of heat transfer surface. By properly controlling the current input to such heat transfer surface and properly choosing the characteristics of the conductors as before set forth, the maximum heat transfer per unit of transfer surface may be maintained below the point at which objectionable conditions of the character referred to are encountered.

Further advantages of the invention arise from the provision of a container characterized by a charging space and a heating space and from the provision of heating means for the heating space freely removable therefrom for inspection and cleaning.

Still other advantages of the invention arise from the provision of a system of the character referred to together with means for maintaining not only the desired temperature conditions throughout the container itself, but throughout the discharge connections and particularly where such discharge connections are of the type permitting discharge at any one of a plurality of different points throughout a predetermined area of distribution.

The utility of the present invention is limited only to materials which are electrically non-conducting at the temperatures encountered, although other materials may be effectively heated by providing the conductors with a suitable insulating coating such as a vitreous enamel or the like.

While we have herein described and illustrated certain preferred embodiments of the present invention, it will be apparent that changes in the construction and operation of the parts may be made without departing either from the spirit of the invention or the scope of our broader claims.

We claim:

1. Material treating apparatus comprising a container, a partition within the container for supporting the material charged into the container to be melted and having openings affording passageways for the melted material to flow by gravity into the lower space of the container, an electric heating device disposed in the lower space of the container and comprising electric resistance heating elements and means including insulators mounting said heating elements so as to be submerged in the melted material, said partition extending in the same general plane transversely of the container and overlying said insulators for segregating the unmelted material from the lower or heating space in the container and for protecting the insulators during charging of material onto said partition, and a delivery conduit connected to the heating space for the discharge of molten material therefrom by gravity.

2. Material treating apparatus comprising a container, a removable partition within the container extending transversely in the same general plane throughout the major portion of the cross-section of the container for segregating the unmelted material from the heating space below the partition, a removable heating device within said heating space, said heating device comprising bare electrical resistor elements and means including insulators for carrying said resistor elements so as to be submerged in the molten material and directly exposed to such material, said partition overlying said insulators for shielding them during a charging operation, and a delivery conduit connected to the heating space for the discharge of molten material therefrom by gravity.

3. Material treating apparatus comprising a container having a charging space at one end of said container and partially segregated from a heating space, a discharge connection for delivering material from said heating space, and electrical heating means for evenly heating said heating space, said heating means comprising a plurality of elongated resistor elements extending in the direction of travel of the material through said container, said elements being substantially uniformly distributed throughout the cross-section of said heating space.

4. Material treating apparatus comprising a container providing a heating space, and electrical heating means for evenly heating said space, said heating means comprising imperforate tubular resistor elements distributed substantially uniformly throughout the cross-section of said heating space, said resistor elements being directly exposed to the material to be treated or free of enclosing insulation.

5. Material treating apparatus, comprising a container including a heating space, and electrical heating means substantially uniformly disposed throughout said space, said heating means comprising a plurality of lengths of substantially tubular material having flattened end portions in electrical connection one with the other, said tubular material being imperforate so as to exclude liquid from the interior thereof.

6. As an article of manufacture, a heater comprising a perforated plate, and electrical heating means beneath and secured to said plate and substantially uniformly disposed relative to the area thereof, said heating means comprising a plurality of lengths of material disposed substantially normal to said plate.

7. In material treating apparatus, a delivery conduit having a plurality of branches in parallel, each branch comprising a plurality of metallic sections in series, joints for placing adjacent sections of each branch in communication, said joints being common to the several branches and being electrically insulated for rendering each branch of the conduit a separate electric conductor, a common delivery nozzle for the several branches, and means for passing electric current through said branches.

8. In material treating apparatus, a delivery conduit having a plurality of branches in parallel, each branch comprising metallic sections in series, joints between adjacent sections of a branch for placing the sections of each branch in communication apart from the other branches, said joints being common to the several branches and being electrically insulated for rendering each branch of the conduit a separate electric conductor, a common discharge nozzle for said branches, means for separately passing electric current through each of said branches, and thermostat control means within said nozzle for controlling the flow of current through said branches to heat the same.

9. Material treating apparatus comprising a container having a charging space and a heating space below the charging space, electrical heating means for evenly heating said heating space, and a support for the unmelted material disposed above the heating space, said heating means comprising a plurality of lengths of straight resistor elements substantially uniformly disposed throughout the cross-section of said heating space, said resistor elements being directly exposed to the material to be treated or free of enclosing insulation, and insulating spacers mounted on said elements to prevent contact therebetween due to warping thereof.

HANS O. SWOBODA.
WILLIAM F. METZGER.